United States Patent
Sun et al.

(10) Patent No.: US 10,663,042 B2
(45) Date of Patent: May 26, 2020

(54) EXTERNAL CIRCULATION BALL SCREW

(71) Applicant: HIWIN TECHNOLOGIES CORP., Taichung (TW)

(72) Inventors: Yi-Lung Sun, Taichung (TW); Chia-Ming Yang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 18 days.

(21) Appl. No.: 16/025,212

(22) Filed: Jul. 2, 2018

(65) Prior Publication Data

US 2020/0003286 A1    Jan. 2, 2020

(51) Int. Cl.
    *F16H 25/22*     (2006.01)

(52) U.S. Cl.
    CPC ..... *F16H 25/2219* (2013.01); *F16H 25/2204* (2013.01); *F16H 25/2214* (2013.01); *F16H 25/2223* (2013.01)

(58) Field of Classification Search
    CPC ........... Y10T 74/19772; F16H 25/2223; F16H 25/2214; F16H 57/042; F16H 57/04; F16H 57/0423; F16H 57/0424
    USPC ...................................... 74/424.87
    See application file for complete search history.

(56) References Cited

U.S. PATENT DOCUMENTS

| 9,446,787 B2 | 9/2016 | Asakura et al. |
| 9,657,820 B1 * | 5/2017 | Hsieh .................. F16H 25/2214 |
| 2013/0199324 A1 * | 8/2013 | Piltz .................... F16H 25/2214 74/424.86 |

FOREIGN PATENT DOCUMENTS

| DE | 102016106986 B3 | 8/2017 | |
| EP | 2515000 A | 10/2012 | |
| EP | 2515000 A1 * | 10/2012 | ......... F16H 25/2214 |
| JP | 2004-353837 A | 12/2004 | |
| JP | 2016-105000 A | 6/2016 | |
| JP | 2017-137953 A | 8/2017 | |
| TW | I509169 B | 11/2015 | |

* cited by examiner

*Primary Examiner* — Randell J Krug
(74) *Attorney, Agent, or Firm* — Muncy, Geissler, Olds & Lowe, PC

(57) ABSTRACT

An external circulation ball screw consisting of a screw shaft, a screw nut, a cover, two reflow members and multiple rolling members is disclosed. The screw nut defines a mounting groove on the outer perimeter and two return holes in the mounting groove. A first half-return channel on a first step in the mounting groove of the screw nut and a second half-return channel in a second step inside the cover constitute a return channel. Alternatively, a third step can be formed in the cover, or the screw nut can be configured to provide a mounting groove and a third step with return holes in the mounting groove. Thus, same size of reflow members can be used with different lengths of return channels.

3 Claims, 7 Drawing Sheets

EXTERNAL CIRCULATION BALL SCREW

BACKGROUND OF THE INVENTION

1. Field of the Invention

The present invention relates to ball screw technology and more particularly, to an external circulation ball screw

2. Description of the Related Art

Regular ball screws are divided into internal circulation type and external circulation type. For high-load applications, external circulation ball screws are usually used. Taiwan Patent 1509169 discloses an external circulation ball screw, which enables the return channels of two reflow members in a mounting groove to be connected together for allowing circulation of the rolling balls so that the ball screw can function smoothly.

However, this design of external circulation ball screw has drawbacks as follows:

1. For screw nuts of different lengths (with different number of thread turns), different molds should be used for making different sizes of reflow members so that the return channels of the reflow members installed in the screw nut can be connected to each other, resulting in an increase in the production cost.

2. The reflow members are manufactured by injection-molding technology, and the reflow members with an increased length are more likely to cause component deformation. In the assembly process, the time for dressing the reflow members will be increased, prolonging the assembly time. In addition, the reflow member transformation will also make the connection of the return channels of the reflow members inaccurate, so that the ball circulation is not smooth.

SUMMARY OF THE INVENTION

The present invention has been accomplished under the circumstances in view. It is the main object of the present invention to provide an external circulation ball screw, which allows the use of same sizes of reflow members with different lengths of screw nuts, saving mold cost.

To achieve this and other objects of the present invention, an external circulation ball screw in one embodiment of the present invention comprises a screw shaft, a screw nut, a cover, two reflow members and a plurality of rolling members. The screw shaft comprises an external thread groove around the periphery thereof. The screw nut is threaded onto the screw shaft and axially movable along the screw shaft, comprising an internal thread groove that defines with the external thread groove of the screw shaft a load path, a mounting groove located on an opposing outer perimeter thereof, two opposite return holes respectively disposed in communication between the mounting groove and the load path, a first step located in the mounting groove between the two return holes and a first half-return channel formed on the first step. The cover is mounted on the screw nut to cover the mounting groove, comprising a second step located at an inner side thereof and a second half-return channel formed on the second step. The second half-return channel and the first half-return channel constitute a return channel. The two reflow members each comprise a passage therein, a first end located at one end of the passage, and a second end located at an opposite end of the passage. The first end of each reflow member is inserted into one respective return hole of the screw nut to keep the passage in communication with the load path. The second ends of the two reflow members are respectively disposed at two opposite sides relative to the return channel to keep the passages in communication with the return channel. Thus, the load path, the return channel and the passages of the two reflow members create a reflow path. The rolling members are movably mounted in the reflow path.

In this embodiment, by means of the arrangement that the first half-return channel and the second half-return channel are respectively disposed in the screw nut and the cover, the external circulation ball screw can still use the reflow members of the same size when the length of the screw nut is different. Using the reflow members of the same size with the return channels of different lengths, the circulation of the rolling members can be achieved. Because it only requires a single size of reflow members, one single size of mold can be used, saving the mold cost. In addition, with the return channel, the length of the reflow members can be shortened, deformation of the reflow members in fabrication can be eliminated, and the ball screw assembly efficiency can be improved.

Preferably, the second end of each reflow member is abutted against the first step or the second step.

Preferably, each reflow member further comprises a flange extended around the second end thereof. The cover further comprises two stop walls respectively disposed at two opposite sides relative to the second step, and a positioning groove defined between each stop wall and the second step. The flanges of the two reflow members are respectively positioned in the positioning grooves. Thus, the reflow members are stably positioned in the screw nut.

Preferably, the cover further comprises a lubrication hole in communication with the return channel. Thus, the user can conveniently fill a lubricating oil into the cover to lubricate the rolling members directly.

In an alternate form of the present invention, the external circulation ball screw comprises a screw shaft, a screw nut, a cover, two reflow members and a plurality of rolling members. The screw shaft comprises an external thread groove around the periphery thereof. The screw nut is threaded onto the screw shaft and axially movable along the screw shaft, comprising an internal thread groove that defines with the external thread groove of the screw shaft a load path, a mounting groove located on an opposing outer perimeter thereof, two opposite return holes respectively disposed in communication between the mounting groove and the load path. The cover is mounted on the screw nut to cover the mounting groove. Said cover or said screw nut comprises a third step located at an inner side thereof between the two return holes and a return channel located on the third step. The two reflow members each comprise a passage therein, a first end located at one end of the passage and a second end located at an opposite end of the passage. The first end of each reflow member is inserted into one respective the return hole of the screw nut to keep the passage in communication with the load path. The second ends of the two reflow members are respectively disposed at two opposite sides relative to the return channel to keep the passages in communication with the return channel. Thus, the load path, the return channel and the passages of the two reflow members create a reflow path. The rolling members are movably mounted in the reflow path.

Preferably, the second end of each the reflow member is abutted against the third step, enhancing positioning stability of the reflow members in the screw nut.

Preferably, each reflow member further comprises a flange extended around the second end thereof. The cover further comprises two stop walls respectively disposed at two opposite sides relative to the third step, and a positioning groove defined between each the stop wall and the third step. The flanges of the two reflow members are respectively positioned in the positioning grooves. Thus, the reflow members are stably positioned in the screw nut.

Preferably, the cover further comprises a lubrication hole in communication with the return channel. Thus, the user can conveniently fill a lubricating oil into the cover to lubricate the rolling members directly.

Other advantages and features of the present invention will be fully understood by reference to the following specification in conjunction with the accompanying drawings, in which like reference signs denote like components of structure.

DETAILED DESCRIPTION OF THE INVENTION

Figure 1:
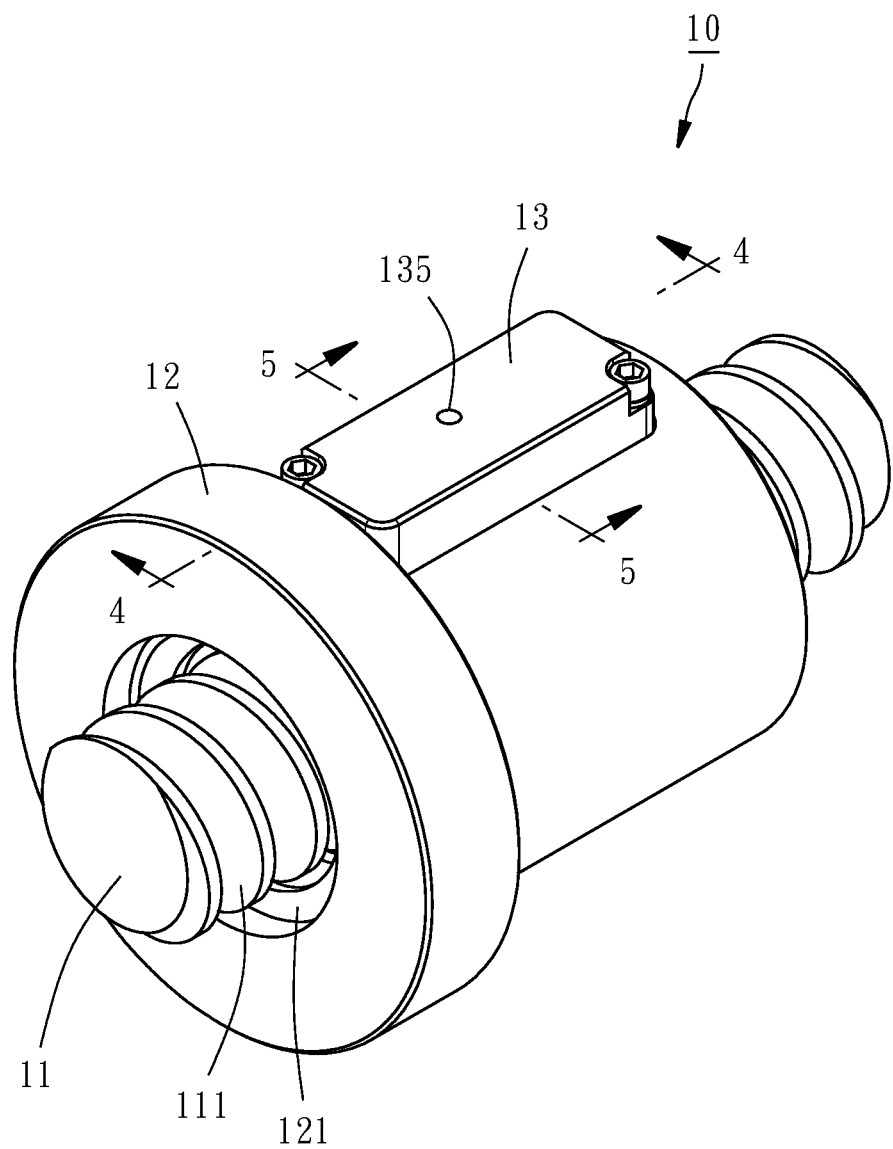
FIG. 1 is an oblique top elevational view of an external circulation ball screw in accordance with a first embodiment of the present invention.
Figure 2:
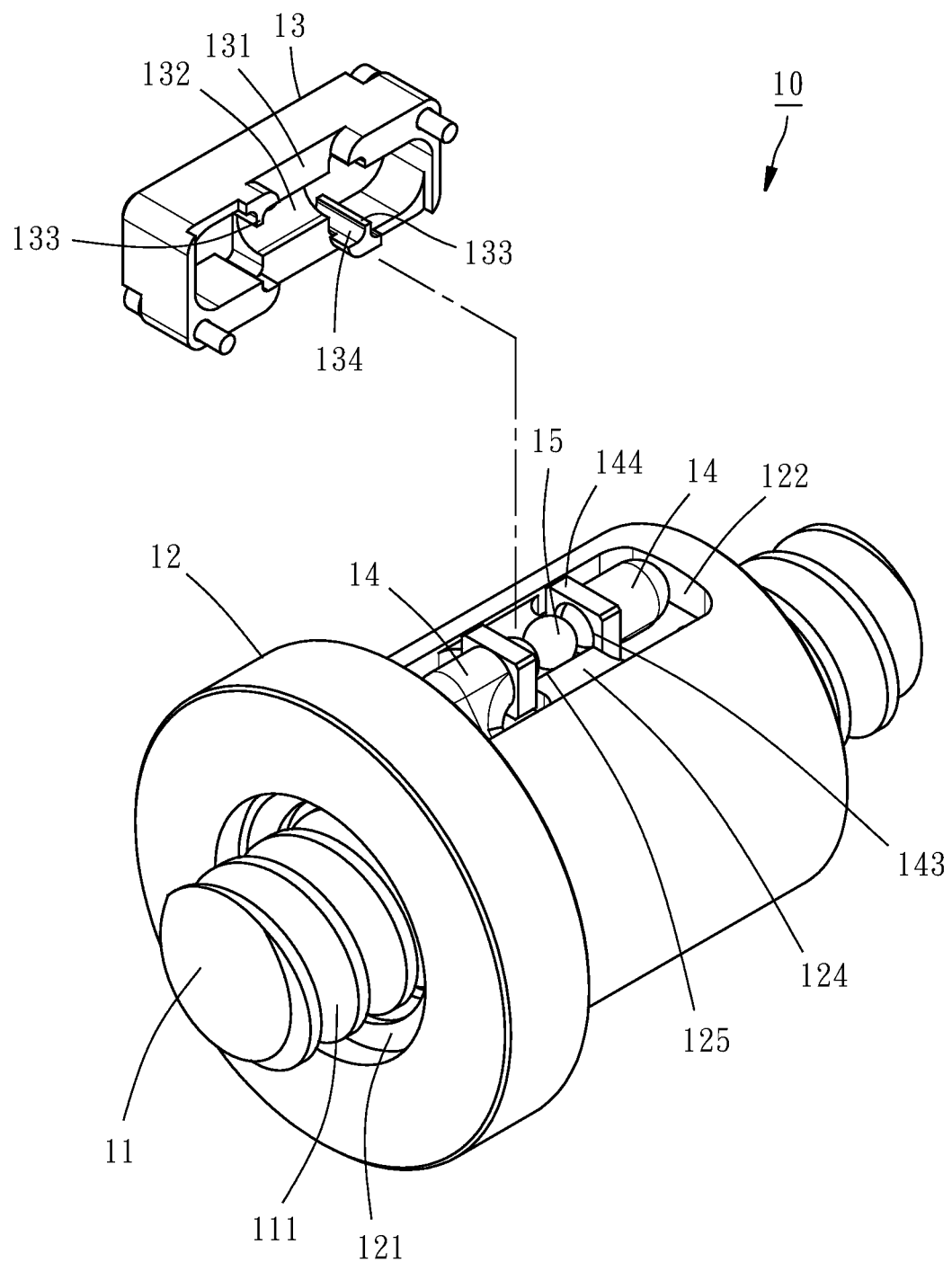
FIG. 2 is an exploded view of a part of the external circulation ball screw in accordance with the first embodiment of the present invention.
Figure 3:
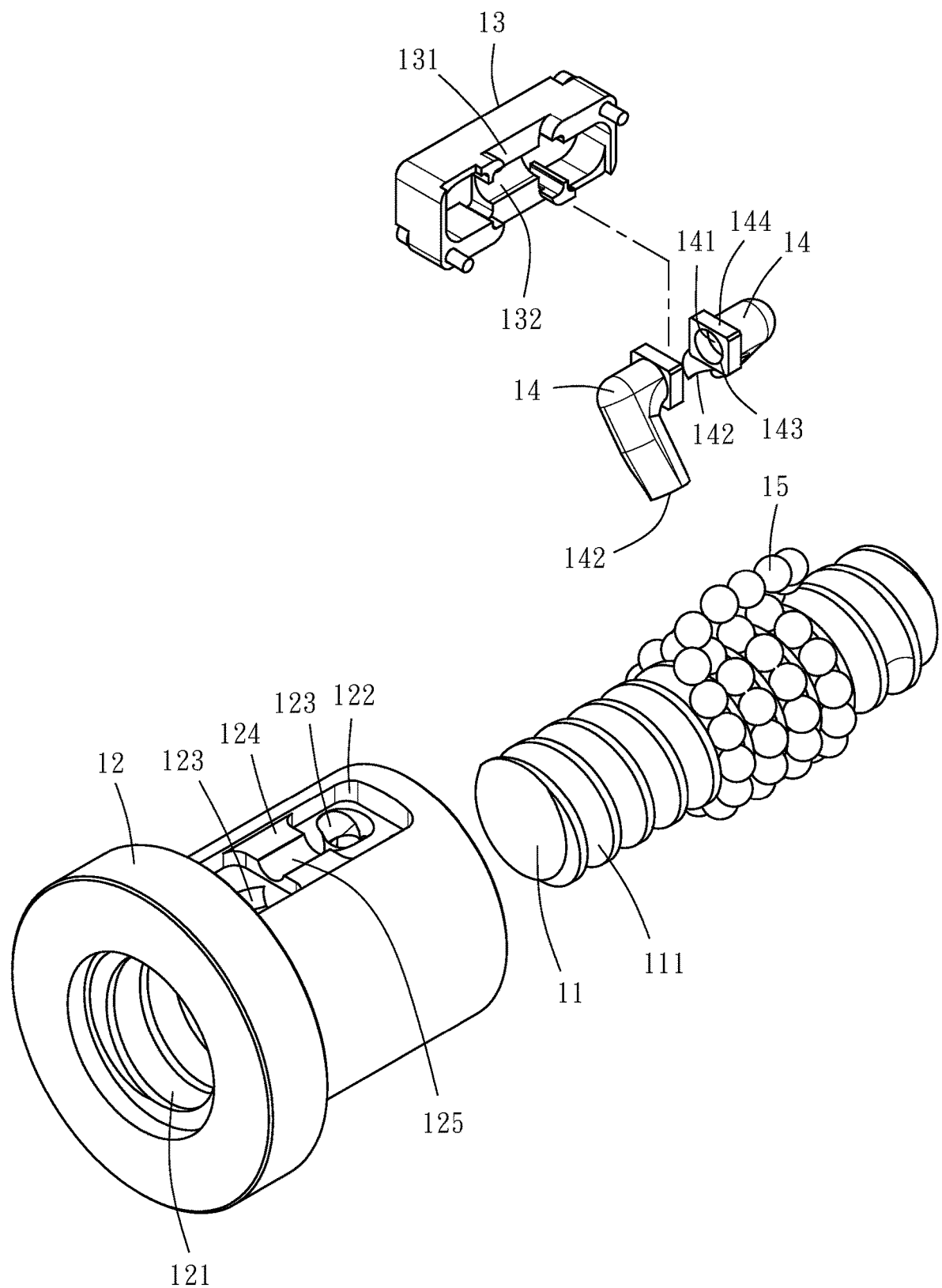
FIG. 3 is an exploded view of the external circulation ball screw in accordance with the first embodiment of the present invention.
Figure 4:
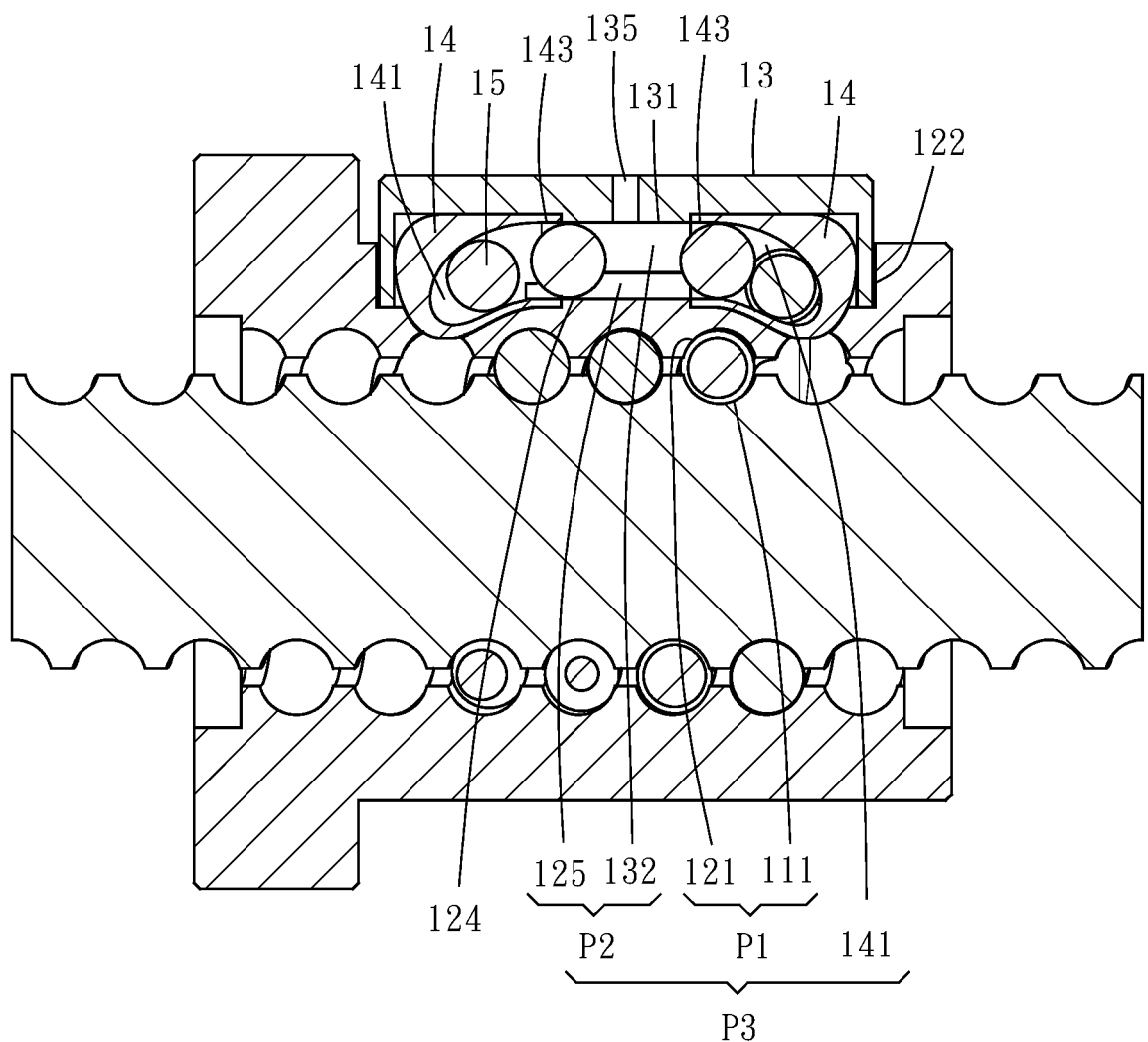
FIG. 4 is a sectional view taken along line 4-4 of FIG. 1.
Figure 5:
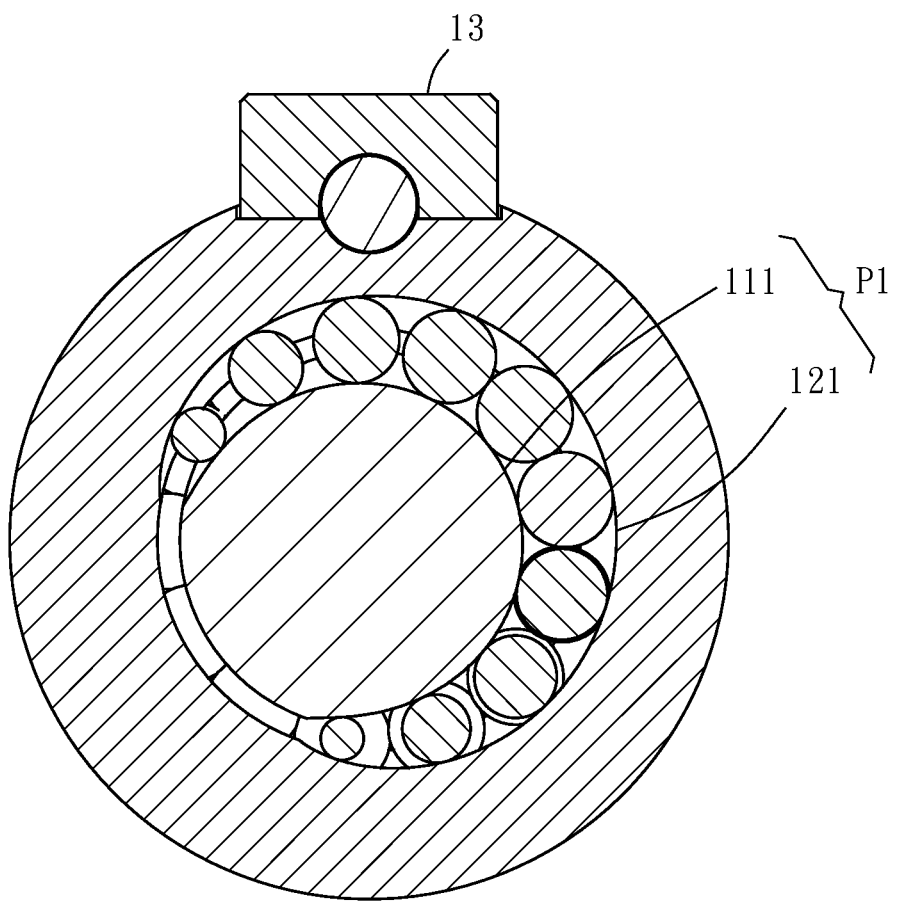
FIG. 5 is a sectional view taken along line 5-5 of FIG. 1.

Referring to FIGS. 1 to 5, an external circulation ball screw 10 in accordance with a first embodiment of the present invention is shown. As illustrated, the external circulation ball screw 10 comprises a screw shaft 11, a screw nut 12, a cover 13, two reflow members 14, and a plurality of rolling members 15.

The screw shaft 11 comprises an external thread groove 111 around the periphery thereof.

The screw nut 12 is threaded onto the screw shaft 11 for axial movement along the screw shaft 11. The screw nut 12 comprises an internal thread groove 121 spirally extended around an inner perimeter thereof and defining with the external thread groove 111 of the screw shaft 11 a load path P1. The screw nut 12 further comprises a mounting groove 122 located on an opposing outer perimeter thereof, and two opposite return holes 123 respectively disposed in communication between the mounting groove 122 and the load path P1. The screw nut 12 further comprises a first step 124 located in the mounting groove 122 between the two return holes 123, and a first half-return channel 125 formed on the first step 124.

The cover 13 is mounted on the screw nut 12 to cover the mounting groove 122, comprising a second step 131 located at an inner side thereof and a second half-return channel 132 formed on the second step 131. The second half-return channel 132 and the first half-return channel 125 constitute a return channel P2.

The two reflow members 14 each define therein a passage 141. The passage 141 has two opposite ends thereof respectively terminating in a first end 142 and a second end 143. The first end 142 of each reflow member 14 is inserted into one respective return hole 123 of the screw nut 12 to keep the passage 141 in communication with the load path P1. The second ends 143 of the reflow members 14 are respectively disposed at two opposite sides relative to the return channel P2, keeping the passages 141 in communication with the return channel P2. The load path P1, the return channel P2 and the passages 141 of the reflow members 14 create a reflow path P3.

The rolling members 15 are movably mounted in the reflow path P3.

With the above structure, the external circulation ball screw 10 of the present invention can still use the reflow members 14 of the same size when the length of the screw nut 12 is different. Using the reflow members 14 of the same size with the return channels P2 of different lengths, the circulation of the rolling members 15 can be achieved. Because it only requires a single size of reflow members 14, one single size of mold can be used, saving the mold cost. In addition, with the return channel P2, the length of the reflow members 14 can be shortened, deformation of the reflow members 14 in fabrication can be eliminated, and the ball screw assembly efficiency can be improved.

It is worth mentioning that in this embodiment, the second end 143 of each reflow member 14 is stopped at the first step 124 or second step 131. In this way, the reflow members 14 can be stably disposed on the screw nut 12. Further, a positioning flange 144 is formed on each reflow member 14 around the second end 143. The cover 13 further comprises two stop walls 133 respectively disposed at two opposite sides relative to the second step 131, and a positioning groove 134 defined between each stop wall 133 and the second step 131. The positioning flanges 144 of the reflow members 14 are respectively positioned in the respective positioning grooves 134. Thus, the reflow members 14 are stably disposed on the screw nut 12.

It should also be noted that although this embodiment has the technical features of the previous paragraph, if it is chosen not to use the technical features of the previous paragraph, it is still possible to achieve the use of the same size of reflow members 14 with screw nuts 12 of different lengths to save mold cost. For example, the second end 143 of each of the reflow members 14 abuts against the first step 124 or the second step 131 respectively or sets the positioning grooves 134 and the positioning flanges 144. Alternatively, the second end 143 may be separated from the first step 124 or the second step 131, or the positioning grooves 134 and the positioning flanges 144 may not be provided, provided that the rolling members 15 are prevented from leaving the reflow path P3 through the passage 141 and the return channel P2, thus, circulation of the rolling members 15 can be maintained.

In addition, in this embodiment, it is also possible to select that the cover 13 has a lubrication hole 135. The lubrication hole 135 communicates with the return channel P2. It is convenient for the user to inject the lubricating oil into the cover 13, to ensure that the lubricating oil directly lubricates the rolling members 15.

Figure 6:
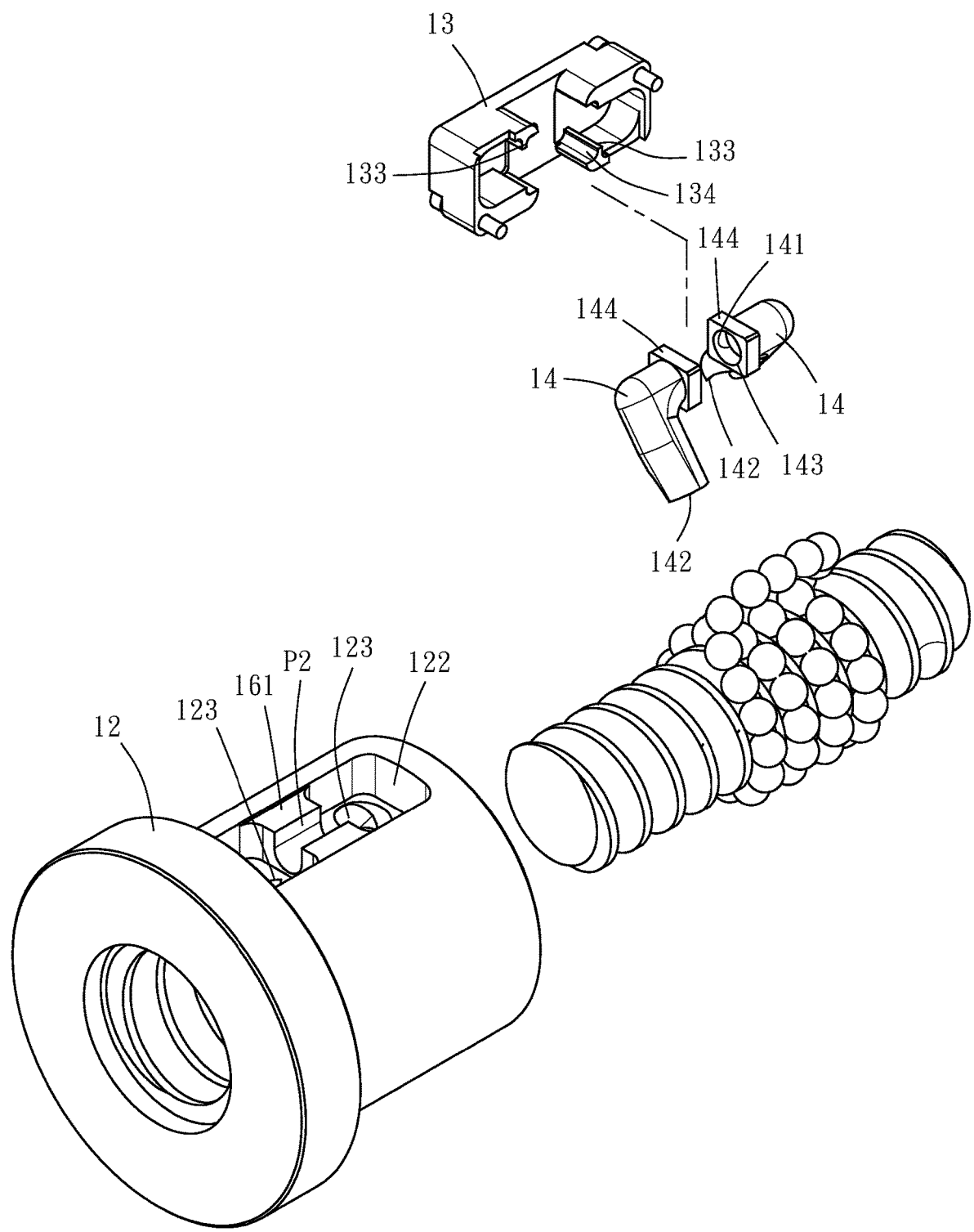
FIG. 6 is an exploded view of an external circulation ball screw in accordance with a second embodiment of the present invention, illustrating a third step formed in the mounting groove of the screw nut.
Figure 7:
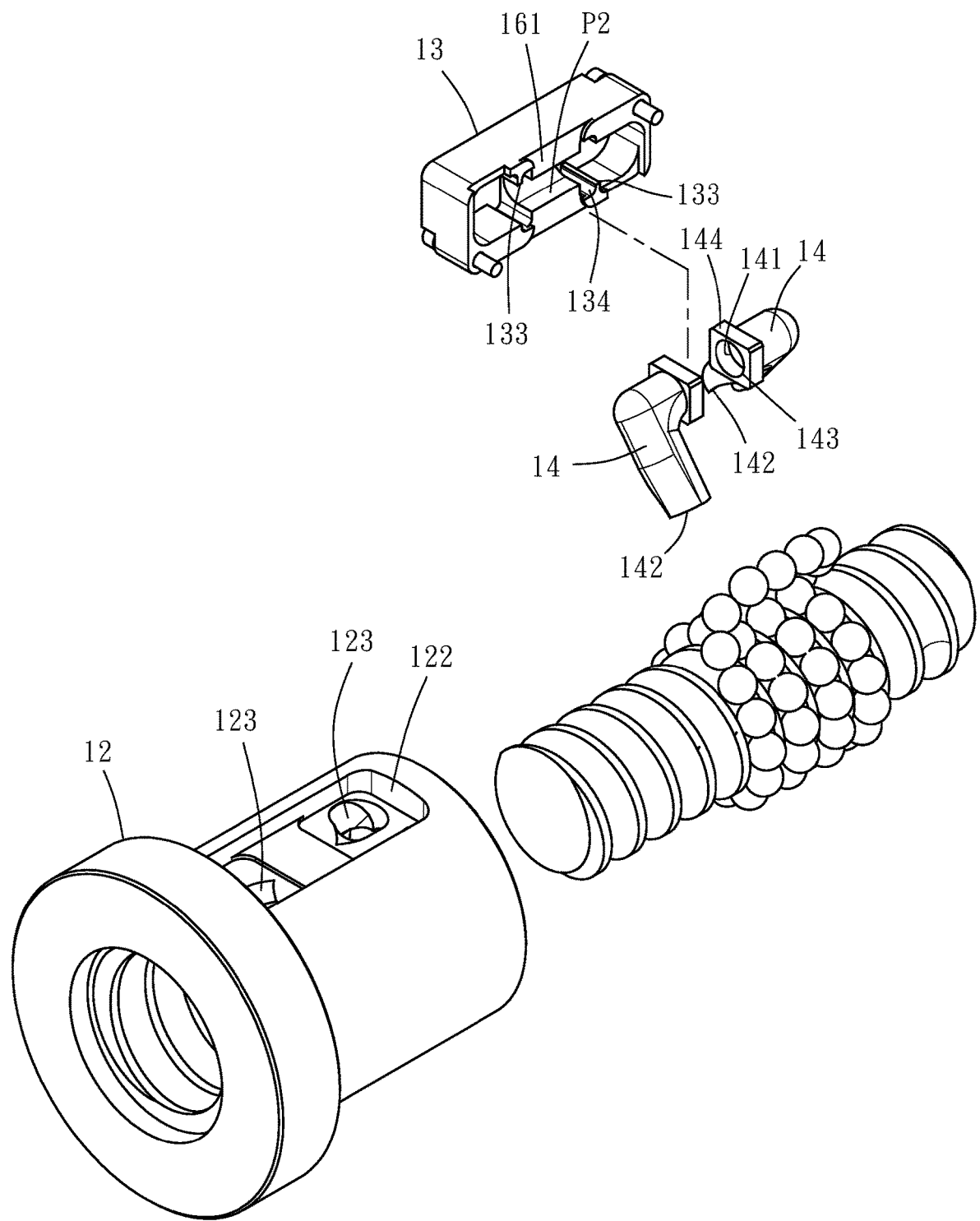
FIG. 7 is an exploded view of the external circulation ball screw in accordance with the second embodiment of the present invention, illustrating a third step formed in the cover.

Referring to FIGS. 6 and 7, an external circulation ball screw 10 in accordance with a second embodiment of the present invention is shown. This second embodiment is substantially similar to the aforesaid first embodiment with the exception that a third step 161 is formed in the cover 13 or the mounting groove 122 of the screw nut 12. The third step 161 is disposed between the two return holes 123. The return channel P2 is located on the third step 161.

In this second embodiment, the second ends 143 of the reflow members 14 are respectively abutted against the third step 161. Thus, the reflow members 14 are stably disposed on the screw nut 12. Further, a positioning flange 144 is formed on each reflow member 14 around the second end 143. The cover 13 further comprises two stop walls 133 respectively disposed at two opposite sides relative to the third step 161, and a positioning groove 134 defined between each stop wall 133 and the third step 161. The positioning flanges 144 of the reflow members 14 are respectively positioned in the respective positioning grooves 134. Thus, the reflow members 14 are stably disposed on the screw nut 12.

If it is chosen not to use the technical features of the previous paragraph, it is still possible to achieve the use of the same size of reflow members 14 with screw nuts 12 of different lengths to save mold cost.

In addition, in this embodiment, it is also possible to select that the cover 13 has a lubrication hole 135. The lubrication hole 135 communicates with the return channel P2. It is convenient for the user to inject the lubricating oil into the cover 13, to ensure that the lubricating oil directly lubricates the rolling members 15.

What is claimed is:

1. An external circulation ball screw, comprising:
   a screw shaft comprising an external thread groove around the periphery thereof;
   a screw nut threaded onto said screw shaft and axially movable along said screw shaft, said screw nut comprising an internal thread groove that defines with said external thread groove of said screw shaft a load path, a mounting groove located on an opposing outer perimeter thereof, two opposite return holes respectively disposed in communication between said mounting groove and said load path, a first step located in said mounting groove between said two return holes and a first half-return channel formed on said first step;
   a cover mounted on said screw nut to cover said mounting groove, said cover comprising a second step located at an inner side thereof and a second half-return channel formed on said second step, said second half-return channel and said first half-return channel constituting a return channel;
   two reflow members each comprising a passage therein, a first end located at one end of said passage and a second end located at an opposite end of said passage, the said first end of each said reflow member being inserted into one respective said return hole of said screw nut to keep said passage in communication with said load path, the said second ends of said two reflow members being respectively disposed at two opposite sides relative to said return channel to keep said passages in communication with said return channel; said load path, said return channel and the said passages of said two reflow members creating a reflow path; and
   a plurality of rolling members movably mounted in said reflow path;
   wherein each of said reflow members comprises a flange outwardly protruded around the second end thereof; said cover comprises two stop walls respectively protruded at two opposite sides relative to said second step, and a positioning groove sandwiched between each said stop wall and said second step; said flanges of said two reflow members are respectively positioned in said positioning grooves.

2. The external circulation ball screw as claimed in claim 1, wherein the said second end of each said reflow member is abutted against said first step or said second step.

3. The external circulation ball screw as claimed in claim 1, wherein said cover further comprises a lubrication hole in communication with said return channel.

\* \* \* \* \*